United States Patent
Huang et al.

(10) Patent No.: US 7,561,032 B2
(45) Date of Patent: Jul. 14, 2009

(54) SELECTABLE LANE-DEPARTURE WARNING SYSTEM AND METHOD

(75) Inventors: Jihua Huang, Sterling Heights, MI (US); William C. Lin, Troy, MI (US); Yuen-Kwok Chin, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 354 days.

(21) Appl. No.: 11/534,373

(22) Filed: Sep. 22, 2006

(65) Prior Publication Data

US 2007/0069874 A1    Mar. 29, 2007

Related U.S. Application Data

(60) Provisional application No. 60/720,441, filed on Sep. 26, 2005.

(51) Int. Cl.
*B60Q 1/00*    (2006.01)

(52) U.S. Cl. ..................... 340/435; 340/436
(58) Field of Classification Search .......... None
See application file for complete search history.

(56) References Cited

U.S. PATENT DOCUMENTS

| | | | |
|---|---|---|---|
| 6,092,014 A * | 7/2000 | Okada ..................... 701/70 |
| 6,107,939 A * | 8/2000 | Sorden ..................... 340/901 |
| 6,161,071 A * | 12/2000 | Shuman et al. ............... 701/48 |
| 6,675,090 B2 * | 1/2004 | Matsuura ..................... 701/200 |
| 6,708,098 B2 | 3/2004 | Matsumoto et al. |
| 6,748,302 B2 | 6/2004 | Kawazoe |
| 7,424,364 B2 * | 9/2008 | Gern et al. .................. 701/301 |
| 2004/0183663 A1 * | 9/2004 | Shimakage ................. 340/436 |
| 2005/0030184 A1 | 2/2005 | Victor |
| 2005/0080565 A1 * | 4/2005 | Olney et al. ................. 701/301 |
| 2005/0273261 A1 | 12/2005 | Niwa et al. |
| 2005/0273264 A1 | 12/2005 | Gern et al. |

* cited by examiner

*Primary Examiner*—Daniel Wu
*Assistant Examiner*—Brian Wilson

(57) ABSTRACT

A selectable lane departure detection system (10) adapted for use by an operator, and with a vehicle (12) traveling upon a thoroughfare having lane-markings (16), and including at least one vehicle condition sensor (22 through 28), a tracking sensor (20) or differential global positioning system (38) configured to determine the location and configuration of the lane-markings (16), and a controller (32) communicatively coupled to the sensors (20 through 28), and configured to determine a spatial relationship between the vehicle (12) and lane-markings (16), determine a sporty driving maneuver by or preference of the operator, modify a predefined warning threshold when so determined, compare the relationship to the adjusted threshold, and issue a warning when the relationship does not exceed the threshold.

11 Claims, 5 Drawing Sheets

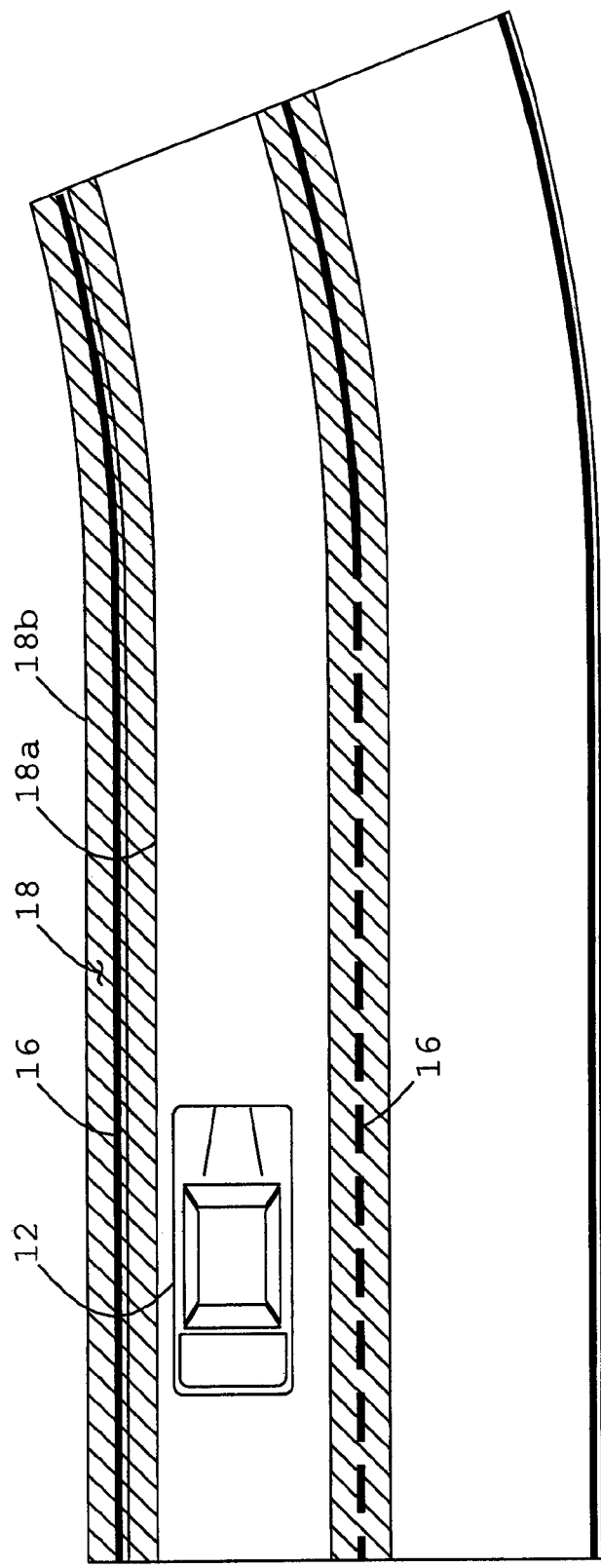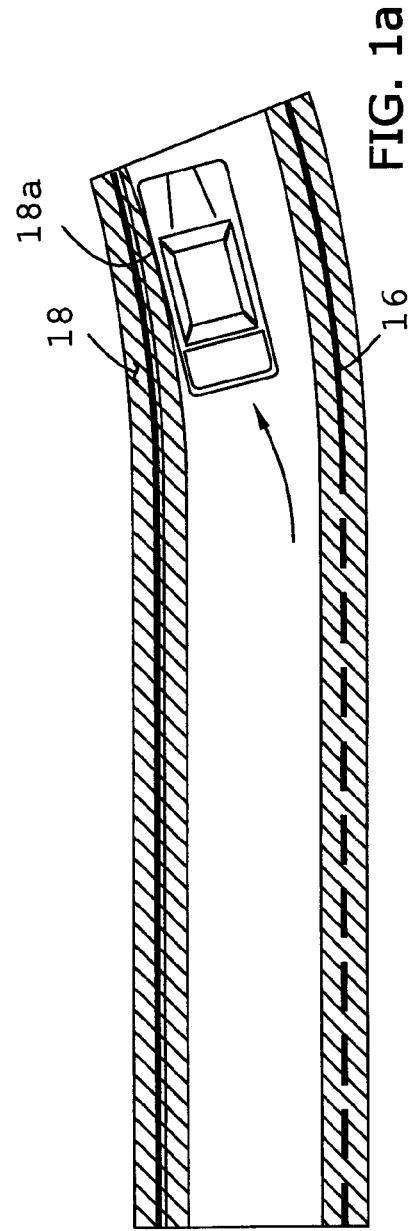

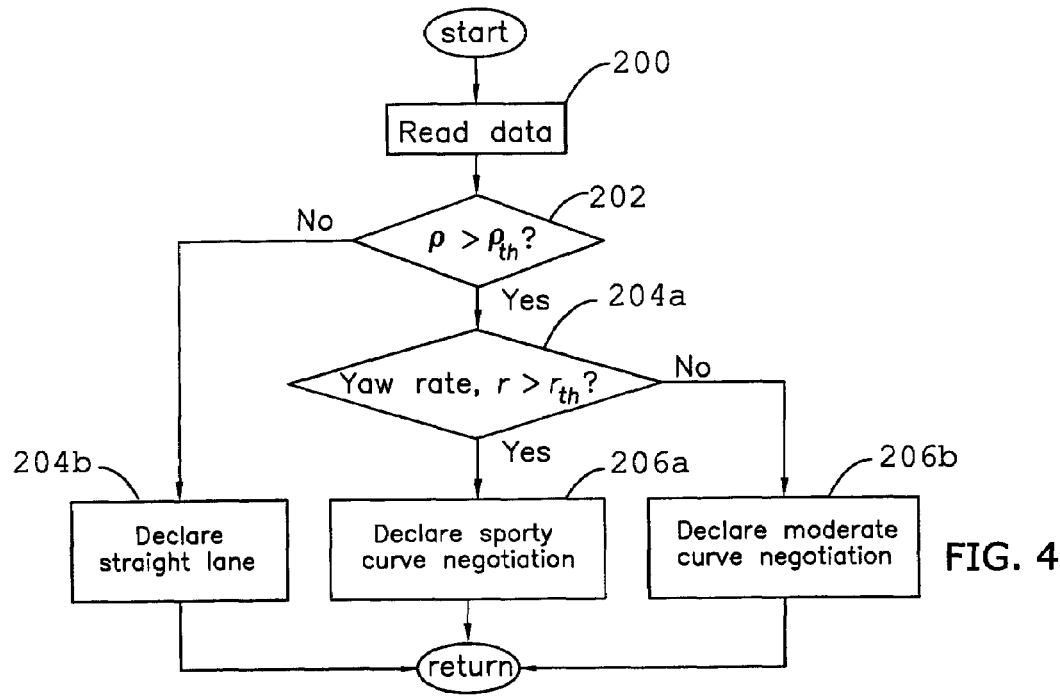
FIG. 4
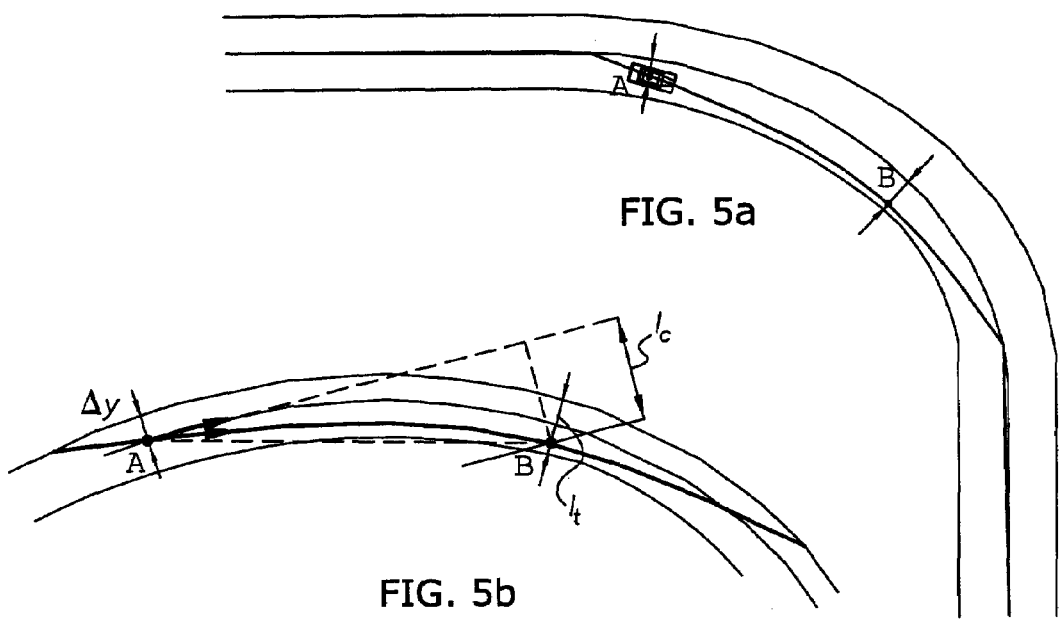
FIG. 5a
FIG. 5b

SELECTABLE LANE-DEPARTURE WARNING SYSTEM AND METHOD

CROSS-REFERENCES TO RELATED APPLICATIONS

This U.S. Non-Provisional patent application claims the benefit of pending U.S. Provisional application Ser. No. 60/720,441 filed on Sep. 26, 2005.

BACKGROUND OF THE INVENTION

1. Technical Field

The present invention relates to lane departure warning and avoidance systems, adapted for use with a vehicle, and more particularly, to a selectable lane departure warning and avoidance system configured to detect a spatial relationship between the vehicle and the boundaries of a lane, and to incorporate operator or vehicular input in the warning decision making algorithm.

2. Background Art

Lane departure warning and avoidance (LDW) systems have been developed to aid the orderly navigation of thoroughfares by vehicle operators. More particularly, these traffic safety systems assist operators (i.e. drivers) in maintaining proper lane alignment by alerting the operator to a possible unintentional lane departure. Unlike scarifications and other measures commonly found on thoroughfare shoulders that alert the operator only after he or she has traversed the lane-marking, LDW systems provide timely warnings prior to lane departure. Further, LDW systems offer effective warning alerts for vehicles in central lanes, and adjacent on-coming traffic, whereas shoulder methods are ineffective.

These LDW systems typically utilize at least one radar/lidar, DGPS/INS and digital map, or camera/video processing sensor to detect the lane markings that delineate a lane boundary. The detected lane-marking range is typically used to determine the lateral position of the vehicle in the lane (i.e., vehicle in-lane position), and a parameter time-to-lane-cross (TTLC) is calculated based on the in-lane position and the motion of the vehicle. If the TTLC is smaller than a pre-defined threshold, a warning is typically issued. Other lateral support systems, such as lane keeping (LK) systems, have similarly been developed.

These LDW systems, however, typically present one-size-fits-all solutions, and do not accommodate the variation in driving styles of different drivers. For example, while negotiating a curve, an operator may elect to perform a "sporty driving maneuver" by intentionally encroaching upon the radially inner lane-marking, and reducing the curvature of his or her projected path, so as to maximize the potential of vehicle lateral acceleration, and tolerate a larger lateral deviation. Under these circumstances, a fixed threshold may trigger a nuisance alarm, as the operator approaches the lane-marking and continues to hug the curve. Needlesstosay, this results in inconvenience and/or distraction to the operator.

Thus, there is a need in the art for a lane departure warning system that is modifiable based on operator driving preference, and more preferably, self-adjusting based on vehicular input.

SUMMARY OF INVENTION

Responsive to these and other concerns, the present invention provides an improved lane departure warning and avoidance system that utilizes operator preference or vehicular input to improve un-intentional lane departure detection. Among other things, the novel system is useful for reducing the likelihood of false alarms during a sporty curve negotiation.

A first aspect of the present invention concerns a selectable lane-departure warning system adapted for use with a vehicle traveling upon a thoroughfare having at least one lane-marking, and by an operator. The system includes a driving-mode selection device selectable between a plurality of driving modes by the operator, at least one sensor configured to determine the lane-marking, and a controller. The sensor and controller are cooperatively configured to produce a lane departure warning, when a spatial relationship between the vehicle and lane-marking, such as the time-to-lane-cross (TTLC), is less than a pre-determined threshold. The controller is communicatively coupled to the device and configured to modify the pre-determined threshold based on the selected driving mode.

A second aspect of the present invention concerns a self-adjusting lane-departure warning system further including at least one vehicle condition sensor configured to determine a current vehicle condition, such as a yaw rate, heading, and/or lateral acceleration. The controller is communicatively coupled to the vehicle condition and lane-marking detection (i.e., tracking) sensors, and configured to compare the condition to a condition threshold, and autonomously modify a predetermined warning threshold to an adjusted threshold, when the condition exceeds the condition threshold. The tracking sensor and controller are cooperatively configured to determine a spatial relationship between the vehicle and lane-marking, and produce a lane departure warning, when the spatial relationship does not exceed the adjusted threshold.

A third aspect of the present invention concerns a selectable lane departure detection system, including a differential global positioning system (DGPS) configured to determine the current position coordinates of the vehicle, in addition to or in lieu of the tracking sensor. In this configuration, the system further includes a map database consisting of a plurality of maps, wherein each map includes a plurality of thoroughfare position points, and indicia correlated with each of the points, and the indicia includes indication of a lane-marking location. The controller is communicatively coupled to the vehicle condition sensor, DGPS, and database, and configured to match the current position coordinates with a thoroughfare position point, compare the condition to a condition threshold, and autonomously modify a predetermined warning threshold to an adjusted threshold, when the condition exceeds the condition threshold.

It will be understood and appreciated that the present invention provides a number of advantages over the prior art, including, for example, providing a more flexible, and therefore reliable lane departure detection system. The preferred system is further configured to provide a lane departure warning system that receives operator driving preference or vehicular input and modifies the production of a warning flag based on the preference or input. By applying a reduction factor to the warning threshold on curved lanes, the system allows the operator to perform a sporty driving maneuver without triggering the lane-departure warning.

Other aspects and advantages of the present invention will be apparent from the following detailed description of the preferred embodiment(s) and the accompanying drawing figures.

BRIEF DESCRIPTION OF DRAWINGS

Preferred embodiment(s) of the invention are described in detail below with reference to the attached drawing figures, wherein:

FIG. 1 is a plan view of a vehicle traveling upon a thoroughfare having an approaching curve, particularly illustrating lane-markings and an exemplary warning zone, in accordance with a preferred embodiment of the present invention;

FIG. 1a is a plan view of the vehicle traveling upon a curved thoroughfare, and a reduced warning zone along the curve, indicative of a sporty mode driving preference, in accordance with a preferred embodiment of the present invention;

FIG. 4 is a flowchart showing a preferred processing algorithm executable by the system to determine whether the vehicle is undergoing a sporty driving maneuver;

FIG. 5a is a plan view of a vehicle undergoing a sporty driving maneuver on a curved thoroughfare, particularly illustrating a projected vehicle path including points A and B;

FIG. 5b is a plan view of the vehicle, thoroughfare, and path shown in FIG. 5a, and a geometric diagram illustrating the change in lateral displacement between the vehicle and thoroughfare centerline from points A to B;

MODES FOR CARRYING OUT THE INVENTION

Figure 2:
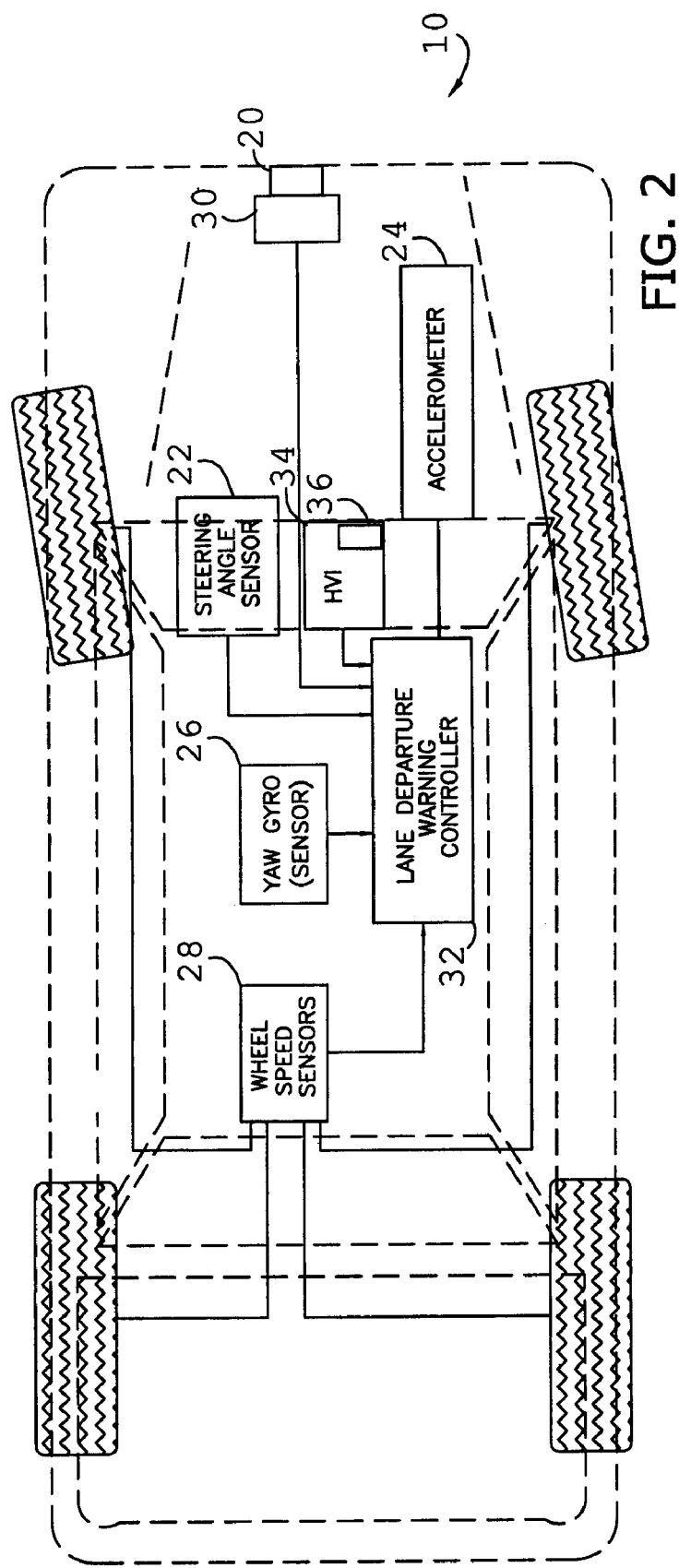
FIG. 2 is a plan view of a vehicle having a preferred selectable lane-departure warning system, in accordance with the present invention, particularly illustrating the general components of the system.

The present invention concerns an improved lane departure warning and avoidance system 10 adapted for use with a vehicle 12 traveling upon a thoroughfare or road, and by an operator 14. The system 10 is described and illustrated herein with respect to automobiles, however, it is certainly within the ambit of the present invention to utilize the system 10 with other lane-based transportation machines, such as boats in a marina. As shown in FIG. 1, the system 10 is configured to detect the position of the vehicle 12, and at least one lane marking 16 that delineates the lane boundary of a lane. As used herein, the term "lane-marking" may include visible marks such as highly reflective paint or thermoplastic stripes (whether in continuous or dashed line-type), curbs, medians, reflectors, and otherwise distinguishable edges of pavement, or invisible marks embedded under pavement such as magnetic elements.

In general, the system 10 is configured to determine a spatial relationship, such as the distance between the lane-markings 16 and vehicle 12 (as measured from the sensor position), and more preferably, the time-to-lane-cross (TTLC). If the relationship does not exceed a predetermined warning threshold (i.e., the distance or TTLC is less than a predefined safe value), the system 10 is configured to alert the operator 14 to a possible unintentional lane departure. The system 10 is further configured to deactivate the warning, once the vehicle 12 has completed the lane departure, and as such, more preferably presents a warning zone 18 defined by earliest and latest warning lines 18a,b (see, FIGS. 1 and 1a). Finally, the system 10 is inventively configured to determine or receive an operator driving preference, and/or vehicular input, and modify the warning threshold or algorithm accordingly. For example, operator preferential input may be singularly received to reduce the warning threshold for drivers who tend to 'float' within their lanes; or, as further described herein, vehicular positioning, curve location data, and operator preferential input regarding moderate or sporty driving styles may be considered to reduce the threshold only when the vehicle manages a curve. Thus, as shown in FIG. 1a, where a sporty maneuver is being performed by the vehicle 12 whose current position coincides with a determined curve location, the system 10 is further configured to reduce the warning threshold, such that the earliest warning line 18a is tapered, and the warning zone 18 is reduced.

In a preferred embodiment, the host vehicle 12 may be equipped with a selectable lane-departure warning system 10 that includes a forward-looking camera 20, a steering angle sensor 22, an accelerometer 24, a yaw gyro 26, wheel speed sensors 28, a video/image-processing unit 30, a warning algorithm controller 32, a human-vehicle interface (HVI) 34, and a driving-mode selection device 36 (see, FIG. 2). The driving-mode selection device 36 allows the operator 14 to select one of a plurality of driving modes. The HVI device 34 provides a warning, such as an alarm sound, when the warning threshold is not exceeded.

Figure 3:
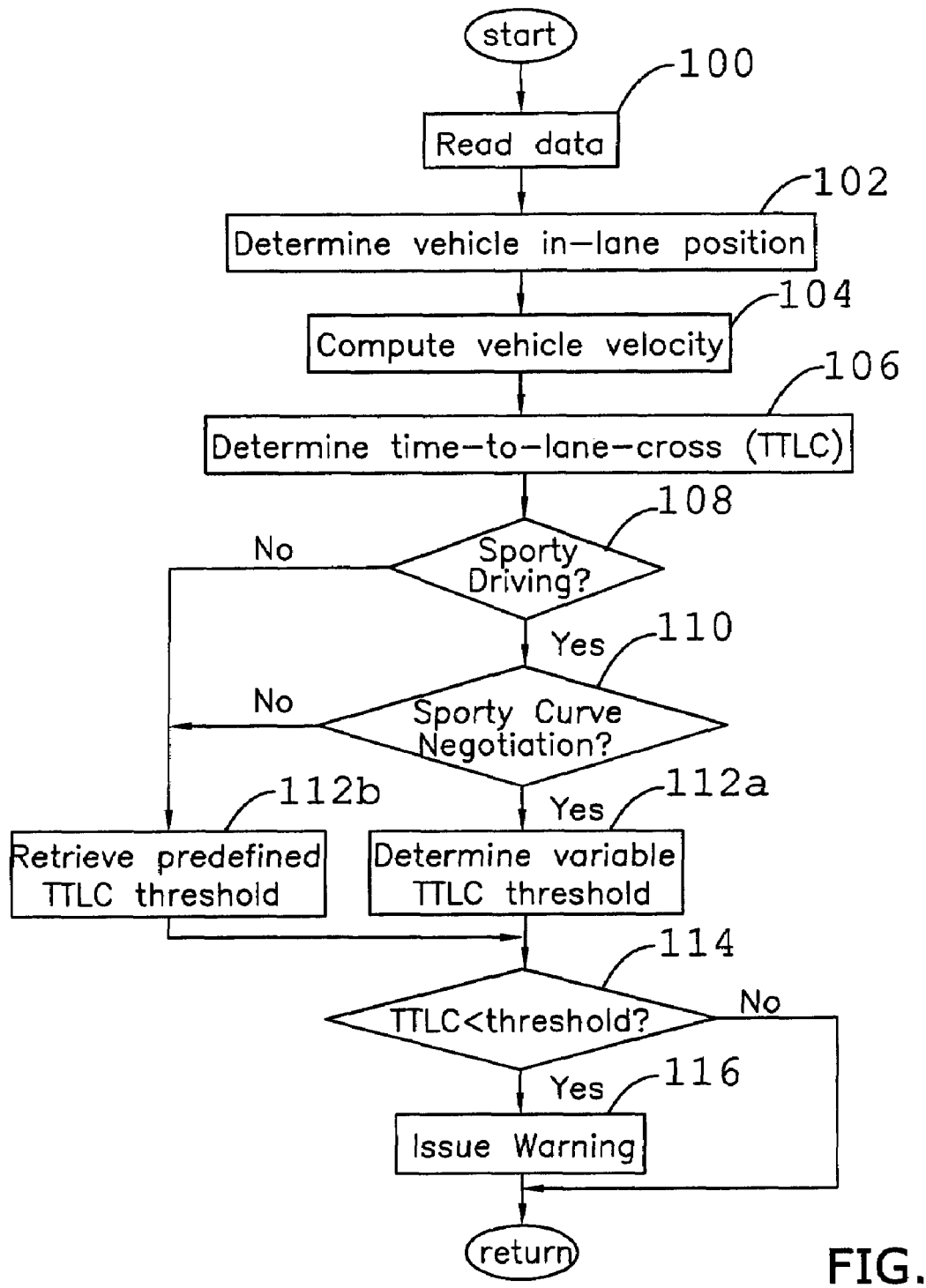
FIG. 3 is a flowchart showing a preferred processing algorithm executable by the system, in accordance with a preferred embodiment of the present invention.

A preferred method to detect an involuntary lane-change and warn an operator 14 is outlined in FIG. 3. The procedure starts at a step 100 by reading an operator preferential driving mode value inputted from the driving-mode selection device 36, and vehicle input, such as frames of vision images from the camera, and signals from on-board motion sensors (such as the yaw gyro 26 and the accelerometer 24). At a step 102, the image-processing unit 30 recognizes the lane markings 16 from the vision image data, and the in-lane position of the vehicle, road curvature, and preferably the centerline of the travel lane are determined. At step 104, the wheel speed sensors 28 are utilized to determine the vehicle velocity. At a step 106, the TTLC is determined based on the in-lane position, and vehicle velocity.

The operator driving mode preference is then analyzed at a step 108 to determine whether the operator 14 has chosen the sporty driving mode. If the a sporty driving mode selection has been entered, then at a step 110, whether the vehicle is undergoing sporty curve negotiation is determined; otherwise the procedure skips to step 112b, where a predefined TTLC threshold is retrieved. If sporty curve negotiation is determined at step 110, a variable TTLC threshold will be calculated or otherwise determined at a step 112a, wherein said variable TTLC threshold is preferably based on the speed, yaw rate, and/or lateral acceleration of the vehicle 12; otherwise, the predefined threshold is retrieved, at step 112b. At a step 114, the warning algorithm then compares the TTLC to the selected threshold. If the TTLC is smaller than the threshold, a warning is issued at step 116; otherwise the method returns to step 100 and continuous until deactivated.

A preferred method of autonomously determining whether the vehicle is undergoing sporty curve negotiation (i.e., step 110 above) is shown in FIG. 4. At a first step 200, the road curvature is derived based on the lane-markings recognized by the image processing unit 30, or other suitable means such as digital map data. Next, at a step 202, the road curvature (ρ)

is compared to a curvature threshold ($\rho_{th}$) to determine whether the road presents a curved lane. If the curvature threshold is not exceeded, the road is recognized as a straight lane at step 204b. If a curved lane is identified, however, further vehicle condition may then be used to differentiate sporty curve negotiations from moderate ones at step 204a for an enhanced performance of this invention. More preferably, as shown in FIG. 4, the yaw gyro 22 is utilized, and most preferably, the yaw rate, lateral acceleration, steering angle, and speed are cooperatively considered. Finally, if the condition threshold (e.g., yaw rate threshold) is exceeded then a sporty curve negotiation is declared at step 206a; otherwise a moderate curve negotiation is recognized at 206b.

More particularly, and as shown in FIGS. 5a and b, where the vehicle 12 undergoes a sporty driving maneuver, the difference between the planned trajectory and the centerline of the lane results in a larger discrepancy between the heading direction of the vehicle 12 and the heading direction of the road, as the operator 14 approaches the longitudinal centerline of the curve. A large heading discrepancy, in turn, typically leads to a large lateral deviation after a given time, $t_{ahead}$. If the vehicle is passing point A with a speed $v_x$ and a lateral deviation $\Delta y$, and the vehicle will arrive at point B after $t_{ahead}$, the actual lateral deviation will be $l_t$, which is approximated by $l_c$ calculated by multiplying the difference in vehicle and roadway heading by $t_{ahead}$. Alternatively, the rate of change in lateral deviation for the immediately preceding two samples, where it is appreciated that the rate of change in lateral deviation is based upon the curvilinear distance traveled between samples, and must be updated after each sample. To that end, the vehicle 12 preferably includes a heading sensor, such as a compass.

The lateral deviation at a look-ahead time $t_{ahead}$ can be predicted as a function of the instantaneous lateral deviation between the vehicle 12 and roadway, $\Delta y$, the vehicle speed, $v_x$, and the road and vehicle headings, and more preferably according to the following formula:

$$\Delta y(t_{ahead}) = \Delta y + (v_x t_{ahead})\sin(\text{road\_heading} - \text{vehicle\_heading}), \quad (1)$$

However, it is appreciated that the calculated lateral displacement ($l_c = \Delta y(t_{ahead})$), as shown in FIG. 5b, predicts a deviation much larger than the actual displacement, $l_t$, because the actual displacement results from a gradual decrease in the heading difference as the vehicle 12 approaches the inner lane-marking.

From (1), a TTLC can be predicted by the following formula:

$$TTLC = \frac{(\text{lane\_width}/2) - \Delta y}{v_x \times \sin(\text{road\_heading} - \text{vehicle\_heading})}. \quad (2)$$

Likewise, it is appreciated that this value will present a smaller period in comparison to a TTLC based on the actual displacement. Thus, if warnings are issued when TTLC is less than a predetermined TTLC threshold (TTLC_threshold), and TTLC_threshold is fixed, the likelihood of a nuisance alarm will be much higher. Instead of implementing complex algorithms heavily based on sensory input to determine a more accurate $l_t$—based TTLC that considers the gradually decreasing change in heading, the system 10 is configured to reduce the likelihood of nuisance alarms by adjusting TTLC or TTLC threshold.

In a preferred embodiment, the lateral deviation and TTLC are adjusted by introducing a variable scaling factor, k, that is preferably related to the instantaneous speed and yaw rate of the vehicle 12. The factor, $k(v_x,r)$, is used to modify formulas (1) and (2), so as to present the following exemplary formulas for calculating the lateral deviation and TTLC:

$$\Delta y_{adjusted}(t_{ahead}) = \Delta y + k(v_x, r)(v_x t_{ahead}) \sin(\text{road\_heading} - \text{vehicle\_heading}), \quad (3)$$

$$TTLC_{adjusted} = \frac{(\text{lane\_width}/2) - \Delta y}{k(v_x, r) \times v_x \times \sin(\text{road\_heading} - \text{vehicle\_heading})}. \quad (4)$$

Thus, the criterion for issuing warning then becomes:

$$TTLC_{adjusted} < TTLC\_\text{threshold} \Leftrightarrow TTLC < k(v_x,r)\, TTLC\_\text{threshold} \quad (5).$$

In other words, the preferred controller 32 is configured to use the product of $k(v_x,r)$ and TTLC_threshold as the variable threshold, while keeping the original calculation of the lateral deviation and TTLC as in formulas (1) and (2). More preferably, $k(v_x,r)$ is limited by 1, so that $k(v_x,r) \leq 1$, and presents a reduction factor. In this regard, it is appreciated that the speed and yaw rate are inversely proportional to the scaling factor, such that the larger the speed or yaw rate, the smaller the scaling factor becomes. Alternatively, the scaling factor may be based on the discrepancy between the vehicle and roadway headings.

Figure 6:
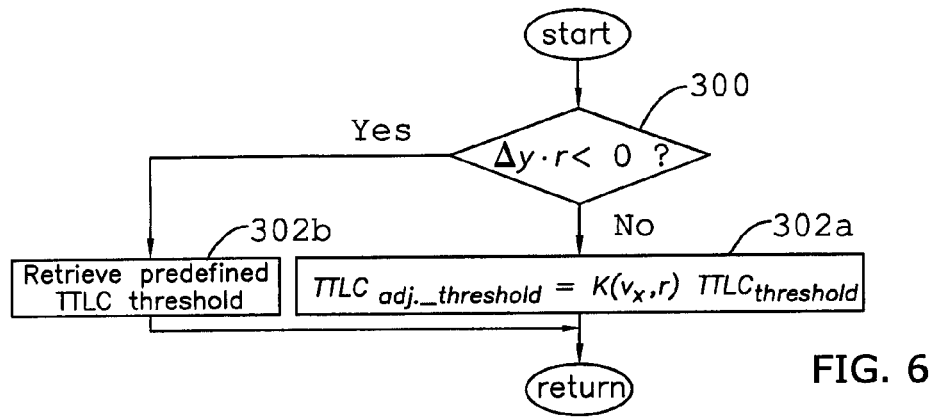
FIG. 6 is a flowchart showing the processing algorithm executed by the system to modify the time-to-lane-cross threshold for sporty curve negotiations.

More preferably, the variable threshold is used only if the vehicle 12 is undergoing a sporty curve maneuver. A preferred method of determining the applicable TTLC threshold is presented in FIG. 6, and begins at a step 300, where the product $\Delta y \cdot r$ is analyzed. Based on the convention of the coordinates fixed on vehicle unsprung mass, it is appreciated that the lateral deviation shares the same sign with the yaw rate, so that $\Delta y \cdot r > 0$ (or greater than a small predetermined threshold), when the vehicle is in the inner side of the pavement. If $\Delta y \cdot r > 0$ the threshold is met, and at a step 302a, a variable threshold calculated by $k(v_x,r) \times TTLC\_\text{threshold}$ is employed in the warning decision making; otherwise, the original threshold is used at parallel alternative step 302b.

Figure 7:
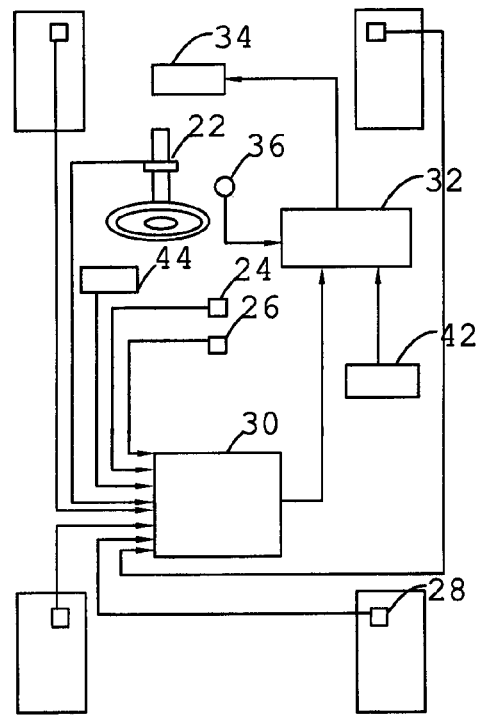
FIG. 7 is a schematic structural diagram of a vehicle equipped with a selectable lane-departure warning system having a differential global positioning system (DGPS) in accordance with a preferred embodiment of the present invention.
Figure 8:
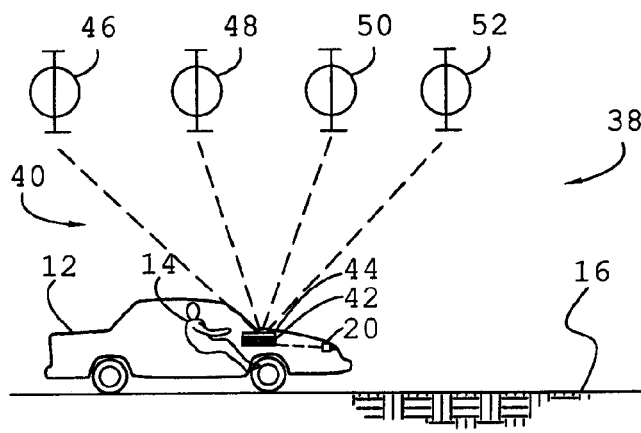
FIG. 8 is an elevation view of an exemplary DGPS system, vehicle and operator.

Alternatively, and as shown in FIGS. 7 and 8, a second embodiment of the present invention includes, in addition to or in lieu of, the forward-looking camera 20, a Differential Global Positioning System (DGPS) 38 communicatively coupled to the controller 32. In this configuration, the DGPS 38 is used to provide the absolute position of the vehicle in earth inertial coordinates, the vehicle heading, and the vehicle in-lane position.

More particularly, the DGPS 38 includes a locator device 40 and, a map database 42 consisting of a plurality of position points. As shown in FIG. 8, the preferred locator device 40 determines the longitude, latitude and height coordinates of the vehicle by utilizing a receiver 44 positioned within the vehicle 12, and preferably at least four mapped satellites 46,48,50,52 communicatively coupled to the receiver 44. Alternatively, other signal sources located at control points could be communicatively coupled to the receiver 44, and other coordinate systems based on a variety of geodetic datum, units, projections, and references could be utilized to pinpoint the vehicle 12. The preferred locator device 40 is configured to correlate the coordinates with one of the map position points.

The database 42 preferably includes a plurality of Enhanced Digital (ED) maps built from GPS data of actual geographic roadways and thoroughfares. The database 42 further includes and is cooperatively configured to provide the controller 32 with precise lane-marking locations and lane configurations. To that end, at least a portion of the points preferably include ID links that enable correlation with indicia conveying an actual condition of the thoroughfare at the given location. In this configuration, the indicia includes the identification of a lane-marking point, and preferably the curvature, and/or roadway heading at the point. Where the database 42 includes only thoroughfare pavement boundaries, the indicia may include a description of the thoroughfare (e.g., "3N2S," for a description of three north bound and two southbound lanes) that could be utilized by the controller 32 to estimate lane-marking locations. Finally, the database 42 may be stored in the system 10 by conventional storage means, such as a DVD-ROM, internal hard disk, or removable memory card, and periodically updated through wireless communication with a third party.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A selectable lane-departure warning system adapted for use with a vehicle traveling upon a thoroughfare having at least one lane-marking, and by an operator, said system comprising:
   a driving-mode selection device selectable between a plurality of driving modes by the operator, and presenting a current selected driving mode;
   at least one tracking sensor operable to detect the relative location and configuration of the at least one lane-marking;
   a controller communicatively coupled to the device and the at least one tracking sensor, and configured to modify a predetermined warning threshold to one of a plurality of adjusted thresholds, wherein each adjusted threshold is correlated to a separate one of the plurality of driving modes, said at least one tracking sensor and said controller being cooperatively configured to determine a spatial relationship between the vehicle and at least one lane-marking, and produce a lane departure warning, when the spatial relationship exceeds the adjusted threshold correlative to the current selected driving mode;
   at least one vehicle condition sensor configured to determine a current vehicle condition, said controller being communicatively coupled to said at least one vehicle condition sensor, and further configured to modify the predetermined threshold based on the condition, so as to correlate each of said adjusted thresholds with a driving mode and the condition;
   said at least one tracking sensor and said controller being cooperatively configured to detect left and right lane-markings, determine a roadway centerline, and the roadway heading,
   said at least one condition sensor including a vehicle speed sensor and a heading sensor, and configured to provide a current vehicle speed, $v_x$, and heading,
   said controller being configured to predict a lateral displacement, from the center line at a future time, $\Delta y(t_{ahead})$, and modify the predetermined threshold based on the predicted lateral displacement,
   said at least one condition and tracking sensors, and said controller being cooperatively configured to determine an instantaneous lateral displacement between the vehicle and centerline, $\Delta y$,
   said controller being further configured to predict the lateral displacement at $t_{ahead}$ in accordance with the following formula:

$$\Delta y(t_{ahead}) = \Delta y + (v_x\, t_{ahead}) \sin(\text{road\_heading} - \text{vehicle\_heading}).$$

2. The system as claimed in claim 1, said at least one tracking sensor being further configured to determine a curvature of said at least one lane-marking, said controller being further configured to compare the curvature to a curvature threshold, so as to determine a curved lane, and reduce the warning threshold, when a curved lane is determined.

3. The system as claimed in claim 2,
   said controller being further configured to modify the predetermined threshold by multiplying it by a reduction factor, k.

4. The system as claimed in claim 3,
   said factor being a function of the vehicle speed, and yaw rate, $k(v_x, r)$.

5. The system as claimed in claim 1,
   said at least one vehicle condition sensor including a steering angle sensor, an accelerometer, a yaw gyro, or a wheel speed sensor.

6. The system as claimed in claim 5; and
   a plurality of vehicle condition sensors including a steering angle sensor, an accelerometer, a yaw gyro, and a wheel speed sensor.

7. The system as claimed in claim 1, said driving modes including a sporty driving mode, said controller being configured to modify the predetermined threshold, when the sporty driving mode is selected.

8. The system as claimed in claim 1, said at least one tracking sensor being a vision sensor including a camera, and image processing unit.

9. The system as claimed in claim 1,
   said spatial relationship being the time-to-lane-crossing (TTLC), as measured between the vehicle and lane-marking.

10. The system as claimed in claim 1, said controller being configured to produce the warning, when an absolute relative distance between the vehicle and at least one lane-marking is less than a predetermined threshold, and then deactivate the warning, when the absolute relative distance returns to a value greater than the predetermined threshold, so as to present a warning zone.

11. The system as claimed in claim 1,
    said tracking sensor and controller being cooperatively configured to further determine the average lane width, lane width,
    said spatial relationship being the time-to-lane-crossing (TTLC) between the vehicle and lane-marking, and determined according to the following formula:

$$TTLC = \frac{(\text{lane\_width}/2) - \Delta y}{v_x \times \sin(\text{road\_heading} - \text{vehicle\_heading})}.$$

* * * * *